Dec. 5, 1967  J. T. LANDIN  3,356,212
INSPECTING METHOD AND APPARATUS

Filed Feb. 24, 1965  2 Sheets-Sheet 1

INVENTOR.
JACK T. LANDIN
BY
ATTORNEYS

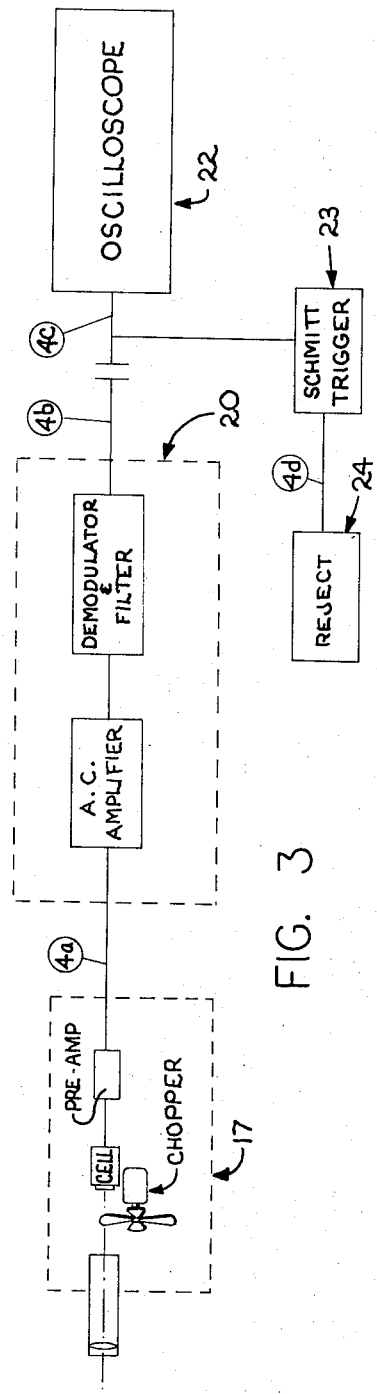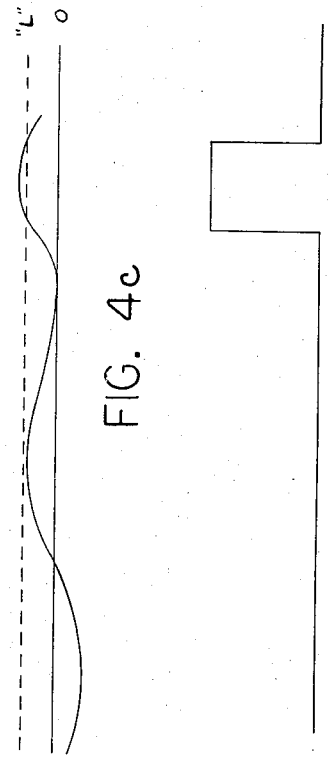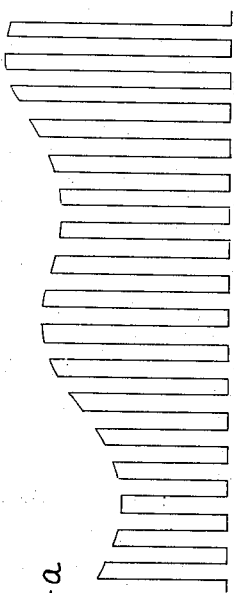

United States Patent Office 3,356,212
Patented Dec. 5, 1967

3,356,212
INSPECTING METHOD AND APPARATUS
Jack T. Landin, Toledo, Ohio, assignor to Owens-Illinois,
Inc., a corporation of Ohio
Filed Feb. 24, 1965, Ser. No. 434,776
4 Claims. (Cl. 209—111.5)

This invention relates to a method and apparatus for inspecting hot, hollow glass articles for wall thickness distribution.

More particularly, this invention relates to a method and apparatus for inspecting glass containers for wall thickness distribution in selected horizontal planes while the containers are still hot from the forming operation and while being conveyed to the annealing lehr.

In the manufacture of glass articles, such as glass containers, the forming of the container involves shaping of a gob of glass into a parison, with the subsequent expansion of the parison by blowing within a blow mold.

In the present day glass manufacturing plants, this method is carried out by machines which are capable of producing a large number of bottles or containers. For example, a well-known machine, such as the IS machine, may be composed of two or more sections, each section of which constitutes, for all practical purposes, an independent forming machine. Each of the sections produces a bottle and the production from two or more of the individual sections are normally placed on a single conveyor which extends from the forming machines to the lehr where they are loaded in the lehr in rows for subsequent heat treatment. The formed bottles carried by the conveyor are relatively hot during the time that it takes the bottles to leave the machines and arrive at the lehr loading position. The IS machine sections being normally placed in line provide containers to the conveyor at regular intervals and the containers, as they are conveyed toward the lehr, naturally have different temperatures due to the fact that they are not always produced in precisely the identical shapes and also due to the fact that some of the containers necessarily have a longer transit time from the individual machines to the lehr.

It has been the practice in the past to select various containers as they are taken from the cold end of the lehr and to mechanically or optically check the containers for glass distribution or wall thickness. However, since there is a considerable time lag between the time the container is produced and the time it eventually appears at the cold end of the lehr, the value of the knowledge received by checking the container at the cold end of the lehr is diminished. This is obvious when considering the fact that many subsequent containers have been produced before a check of one of the containers indicates that the wall thickness distribution is poor. Furthermore, considerable expenditure is involved in annealing containers and if they are not good containers, it would be desirable to select them out and discard those which exhibit poor wall thickness distribution characteristics prior to annealing them.

The present invention provides a method for inspecting hot, hollow glass articles for wall thickness distribution wherein the hot articles such as containers are produced at a plurality of machine locations and are scanned by an infra-red detector. Applicant has found that the actual temperature of the containers at the time of inspection is not critical, it only being necessary that the containers be emitting infra-red radiation. This condition will persist for a sufficient length of time after the forming of the bottles so that they may be moved to an inspection position, inspected and carried to a lehr for subsequent annealing treatment. By suitable treatment of the output signal from the infra-red detector, applicant is able to segregate bottles or containers which have poor wall thickness distribution characteristics. An infra-red detector, of the type applicant is using, is sensitive to radiation from the container and the relative intensity of the radiation emitted from any individual container provides an index of the relative thickness of the wall of the container throughout the region being scanned.

With the foregoing in view, it is an object of this invention to provide a method and apparatus for inspecting containers while they are still hot from the forming thereof and prior to their being placed in the annealing lehr.

It is an additional object of this invention to provide a method and apparatus for inspecting containers for wall thickness distribution without regard to the temperature of the containers but while the containers are relatively hot, such as in the neighborhood of 1000–1100° F.

It is a still further object of this invention to provide a method and apparatus for inspecting containers for wall thickness distribution while the containers are still hot from the forming and segregating those containers which have poor wall thickness distribution prior to loading in the lehr.

Other and further objects will become apparent from the following description taken in conjunction with the annexed sheets of drawings, wherein:

FIG. 3 is a schematic circuit diagram of the indicating system of the invention;

FIG. 4a is a scope trace of the signal appearing at the output of the amplifier in the detector head;

FIG. 4b is a scope trace of the demodulated and filtered signal appearing at the output of the electronic chassis;

FIG. 4c is a scope trace of the signal appearing at the input to the oscilloscope;

FIG. 4d is a scope trace of the signal appearing at the output of the Schmitt trigger of FIG. 3.

Figure 1:
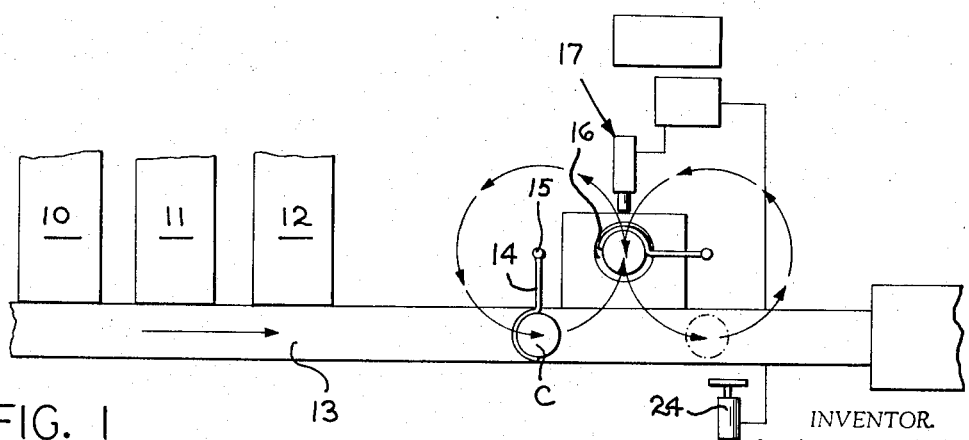
FIG. 1 is a schematic top plan view illustrating the inspection system of the invention.

With reference to FIG. 1, there is shown schematically a series of forming machine sections 10, 11 and 12, each of which, as explained above, is capable of forming complete containers. The machines 10, 11 and 12 have unloading equipment included therein which will place the formed containers on a conveyor 13. The timing of the machines in their forming cycle is such that the containers are placed on the conveyor 13 without interference with each other and at spaced intervals thereon, it being understood that the conveyor 13 is continuously running in the direction of the arrow thereon.

Figure 2:
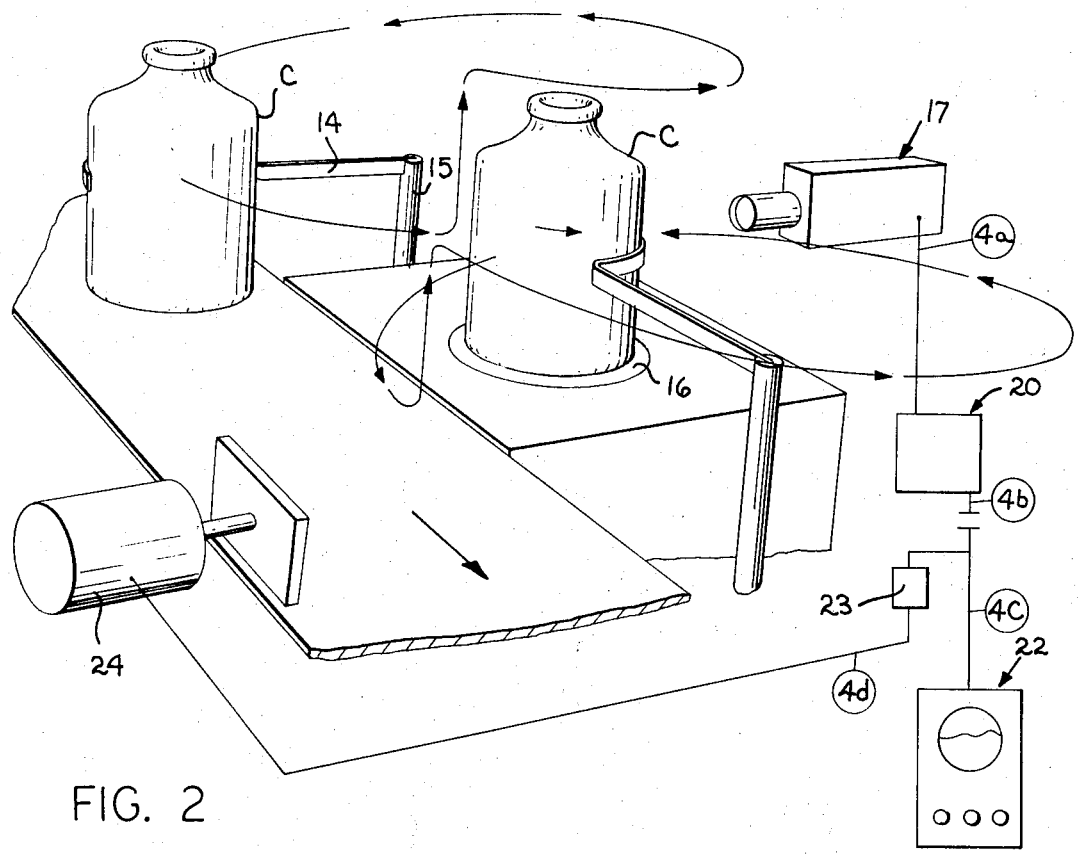
FIG. 2 is a schematic perspective view of the inspection station of the invention on an enlarged scale.

As the containers C reach the point of travel on the conveyor indicated on FIGS. 1 and 2, a transfer arm 14, swings about the axis 15, engages the container C and moves it onto a pad 16. The arm 14 is then automatically raised and continues its counter-clockwise travel over the top of the container C. In this manner containers are swept from the conveyor at selected intervals and placed on the pad 16. The pad 16 in turn rotates in a counter-clockwise direction by a suitable drive mechanism (not shown).

An infra-red radiation detector, generally designated 17, is mounted so that its field of view intercepts the container C resting on the pad 16. One rotation of the container provides the detector 17 with a view of a circumferential portion of the container. The detector 17 is of the type which has a light chopper contained therein which interrupts the radiation received by the sensitive element of the detector at a predetermined frequency.

The detector head 17 may be of the type such as an Ircon model 710F. The sensitive element of the detector head 17 is an indium-antimonide cell which is sensitive to infra-red radiation. By using a detector head having a chopper, the signal, which would normally be a D.C. signal, from the cell is broken up into a plurality of D.C. pulses. This signal is amplified and, for a single rotation of the container which is emitting infra-red radiation, would have a wave form such as that shown in FIG. 4a. Thus the signal has the form of a plurality of square wave signals rising from a reference level to an elevated level corresponding to the amount of radiation sensed by the cell during the interval between the interception of the chopper.

The amplitude of the signal reflects the instantaneous surface temperature of the container or the radiation received by the cell.

It should be pointed out that the hot bottles or containers C, when they arrive at the pad 16, are still radiating and the detector head 17 will sense the radiation emitted from the bottle. The particular head which is used is provided with suitable filtering so that a limited range of wave lengths is passed to the cell. This sensed radiation is actually the "skin" temperature of the bottle and does not reflect the radiation or visual glow which may occur deeper within the bottle, the "skin" temperature being that temperature that the bottle possesses at the surface and at a depth of no more than a tenth of an inch beneath the surface. Any infra-red radiation which occurs deeper than one tenth of an inch will not reach the cell due to the above mentioned filtering.

It should be understood that the "skin" temperature of the hot container after removal from the mold reflects the quantity of heat that the glass possesses in the region of the "skin," thus thicker sections will cause higher "skin" temperatures and thus produce greater intensity of radiation in this portion of the infra-red spectrum. This phenomenon is true from the standpoint that when bottles are blown with in blow molds, the molds invariably are cooler than the glass and a great amount of heat is extracted from the glass by thermal conduction into the metal of the blow mold. However, when the container is removed from the blow mold a finite time, the "skin" or outer surface of the container is subjected to reheat by the hot glass in back of the "skin." This reheat continues until some sort of equilibrium condition is reached.

The square waves derived by the infra-red detector head 17 with its chopper, is amplified so that the signal appearing at the output of the head will have the wave form illustrated in FIG. 4a. This signal, in turn, is connected to an A.C. amplifier and synchronous demodulator and filter 20. The output of the circuit 20 will have the wave form illustrated in FIG. 4b, which is a D.C. signal corresponding to the radiation falling on the cell. This signal is A.C. coupled (FIG. 4c) to the scope 22 where it may be visually observed as a change in temperature which corresponds to the thickness of the container. This output signal (FIG. 4c), for reject purposes, is also fed to a Schmitt trigger 23 which will have an output in the form of a square wave, as shown in FIG. 4d if the reject level is exceeded. The duration of the pulse at the output of the Schmitt trigger is unimportant from the standpoint that once the trigger fires it will, through suitable delay means, operate a reject solenoid 24. The pulse duration will normally correspond to the duration of that portion of the signal which reaches the Schmitt trigger that is above a predetermined level L. Thus, whenever the detector head senses a difference in radiation of a predetermined amount, it will operate the reject solenoid 24 to eject the container from the conveyor 13. In this manner the apparatus segregates those containers which have poor wall distribution characteristics from those which have acceptable wall thickness distribution.

Other and further modifications may be resorted to within the spirit and scope of the appended claims.

I claim:
1. A method of inspecting hot, hollow glass articles for wall thickness distribution in a horizontal plane normal to the axis of the article comprising, conveying said hot articles in succession to an inspection station, positioning the hot article at the inspection station in the field of view of an infra-red detector, rotating the article about its axis, deriving a pulsating D.C. output signal from the detector functionally proportional to the instantaneous surface temperature of the article, amplifying the output signal from the detector, and indicating the A.C. component of the detector output as an indication of the wall thickness distribution of the hot glass article.

2. A method of inspecting hot, hollow glass articles produced by a plurality of forming machines for wall thickness distribution in a horizontal plane normal to the axis of the article comprising, conveying the hot articles in succession into the field of view of an infra-red detector at an inspection station, rotating the articles about their axes, deriving an output signal from the detector functionally proportional to the instantaneous surface temperature of the article, amplifying the output of the detector, and utilizing the A.C. component of the detector output as an indication of the wall thickness distribution of the hot glass articles.

3. The method of inspecting a plurality of hot, hollow glass articles for wall thickness distribution which articles have been just produced, conveying the hot articles in succession into the field of view of an infra-red detector having a chopper, an inspection station, rotating each article about its vertical axis when in the field of the detector, deriving an output signal from the detector proportional to the instantaneous surface temperature of the article, measuring the A.C. component of the detector output as an index of the wall thickness distribution of the hot glass article, and rejecting those articles which give an output signal amplitude greater than a preset maximum.

4. Apparatus for inspecting hot, hollow glass articles for wall thickness distribution in a horizontal plane normal to the axis of the article comprising, an infra-red radiation sensitive detector having a chopper, a conveyor, means for moving the hot article to be inspected from the conveyor into the field of view of the infra-red detector, means for rotating the article about its vertical axis, means connected to said detector for indicating when an article has a surface temperature differential greater than a preset maximum, means for moving the article, after inspection, back to the conveyor, and means connected to said indicating means and positioned adjacent said conveyor for ejecting articles from the conveyor in response to a signal from said indicating means.

References Cited
UNITED STATES PATENTS

| | | | |
|---|---|---|---|
| 2,593,127 | 4/1952 | Federchak | 250—224 X |
| 2,915,638 | 12/1959 | Poole | 50—83.3 |
| 3,188,256 | 6/1965 | Shoemaker | 250—83.3 |

ARCHIE R. BORCHELT, *Primary Examiner.*

RALPH G. NILSON, *Examiner.*

J. D. WALL, *Assistant Examiner.*